United States Patent
Kim et al.

(10) Patent No.: US 12,299,059 B2
(45) Date of Patent: May 13, 2025

(54) METHOD AND APPARATUS FOR MESSAGING SERVICE

(71) Applicants: KAKAO CORP., Jeju-si (KR); Kakao Enterprise Corp., Seongnam-si (KR)

(72) Inventors: Eun Hye Kim, Seongnam-si (KR); Han Wool Cha, Seongnam-si (KR); Seok Gyu Lee, Seongnam-si (KR); Sul Gi Kim, Seongnam-si (KR); In Hae Choi, Seongnam-si (KR); Chang Hyuk One, Seongnam-si (KR)

(73) Assignees: KAKAO CORP., Jeju-si (KR); DK TECHIN CORP., Seongnam-si (KR)

( * ) Notice: Subject to any disclaimer, the term of this patent is extended or adjusted under 35 U.S.C. 154(b) by 0 days.

(21) Appl. No.: 18/318,635

(22) Filed: May 16, 2023

(65) Prior Publication Data

US 2023/0367831 A1  Nov. 16, 2023

(30) Foreign Application Priority Data

May 16, 2022  (KR) .......................... 10-2022-0059856

(51) Int. Cl.
*G06F 17/00* (2019.01)
*G06F 16/9535* (2019.01)
(Continued)

(52) U.S. Cl.
CPC ...... *G06F 16/9538* (2019.01); *G06F 16/9535* (2019.01); *H04L 51/046* (2013.01)

(58) Field of Classification Search
CPC ............. G06F 16/9538; G06F 16/9535; G06F 16/955; G06F 16/958; H04L 51/046;
(Continued)

(56) References Cited

U.S. PATENT DOCUMENTS 10,547,571 B2 *  1/2020  Joe .......................... G06F 16/951
2008/0140779 A1 *  6/2008  Ahn ........................ G06Q 10/06
                                                                 709/205
(Continued)

FOREIGN PATENT DOCUMENTS

KR  20160131866 A  11/2016

OTHER PUBLICATIONS

Frank R. Bentley et al., SearchMessenger: Exploring the Use of Search and Card Sharing in a Messaging Application. In Proceedings of the 2017 ACM Conference on Computer Supported Cooperative Work and Social Computing. Asso. for Computing Machinery, 1946-1956,<https://doi.org/10.1145/2998181.29982>, Feb. (Year: 2017).*

*Primary Examiner* — Greta L Robinson
(74) *Attorney, Agent, or Firm* — SEED IP LAW GROUP LLP

(57) ABSTRACT

A method and an apparatus for a messaging service are disclosed. A method of operating a search server interlinked with a messaging service includes receiving an immediate sharing request of a search result for a search term, obtaining identification information of a search result page corresponding to the search term, obtaining rendering information of the search result page corresponding to the identification information, and generating the rendering information of the search result page as a message transmitted through the chat interface.

17 Claims, 9 Drawing Sheets

(51) Int. Cl.
*G06F 16/9538* (2019.01)
*H04L 51/046* (2022.01)

(58) Field of Classification Search
CPC ......... H04L 51/18; H04L 51/07; G06Q 50/10; G06Q 50/40
See application file for complete search history.

(56) References Cited

U.S. PATENT DOCUMENTS

2015/0302096 A1* 10/2015 Iwasaki ............ G06F 16/90332
 707/722
2018/0077160 A1 3/2018 Call

* cited by examiner

METHOD AND APPARATUS FOR MESSAGING SERVICE

CROSS-REFERENCE TO RELATED APPLICATIONS

This application claims the benefit of Korean Patent Application No. 10-2022-0059856 filed on May 16, 2022, in the Korean Intellectual Property Office, the entire disclosure of which is incorporated herein by reference for all purposes.

BACKGROUND

Technical Field

One or more embodiments relate to a method and an apparatus for a messaging service, and more specifically, to a search server interlinked with a messaging service.

Description of the Related Art

The advancement in mobile smart devices has increased the use of online platform services for interaction with other users over a network. The online platform services for interaction with other users may include, as representative examples, a social networking service (SNS) which is an online platform for generating and consolidating social relationships through communication among users, information sharing, and expansion of personal connections, and an instant messaging service (IMS) which is an online platform for real-time content communication between two or more users.

The increase in communication via mobile devices has further allowed the online platform services to support functions for sharing various types of data and assisting communication in addition to a function for users to have one-on-one communication with other users by text.

BRIEF SUMMARY

Embodiments provide a messaging service that includes a search function of providing a search result page for a search term input to a chat interface and sharing the search result page in the form of a message in addition to a function of sending and receiving messages.

Embodiments provide a function of sharing a search result page in the form of a message without a process of outputting the search result page for a search term in advance.

However, the technical aspects are not limited to the aforementioned aspects, and other technical aspects may be present.

According to an aspect, there is provided a method of operating a search server interlinked with a messaging service including receiving an immediate sharing request of a search result for a recommended search term provided through a chat interface in a search mode, from a terminal that drives an app for the messaging service, obtaining identification information of a search result page corresponding to the recommended search term based on the immediate sharing request, obtaining rendering information of the search result page corresponding to the identification information, and generating a message for the search result page transmitted through the chat interface based on the rendering information of the search result page.

The receiving of the immediate sharing request may include determining a selected recommended search term as a search term based on a selection input for a recommended search term received through a predetermined area in which a list of recommended search terms is displayed in the chat interface and receiving the immediate sharing request for the determined search term.

The list of recommended search terms may include at least one of a keyword input to a message input window in the chat interface, a related search term of a search term input to the message input window, a keyword input to a search window in the chat interface, a related search term of a search term input to the search window, and a keyword in a search history corresponding to a user account logged into the terminal.

The rendering information of the search result page may include a command to output the search result page created in a browser.

The immediate sharing request may include identification information of a user account logged into the terminal, identification information of a chat room corresponding to the chat interface, and a search query corresponding to the recommended search term.

The obtaining of the identification information of the search result page may include obtaining identification information of a search result page corresponding to a predetermined type among a plurality of search result pages corresponding to the recommended search term.

The message may include a link to the search result page and visual content based on the rendering information.

The message may be sent to a terminal of a user account participating in a chat room corresponding to the chat interface.

The chat interface may include a chat interface switched to a search mode to call a search function.

According to an aspect, there is provided a method of operating a terminal on which an app for a messaging service is installed including receiving a list of recommended search terms through a chat interface of the app switched to a search mode, requesting immediate sharing of a search result for a search term based on the list of recommended search terms provided through the chat interface, and receiving a message for a search result page of the search term through the chat interface.

The receiving of the list of recommended search terms may include transmitting a keyword input to the chat interface switched to the search mode to a search server interlinked with the messaging service and receiving, from the search server, a list of recommended search terms including at least one recommended search term corresponding to the keyword.

According to an aspect, there is provided a search server interlinked with a messaging service including at least one processor configured to receive an immediate sharing request of a search result for a recommended search term provided through a chat interface in a search mode, from a terminal that drives an app for the messaging service, obtain identification information of a search result page corresponding to the recommended search term based on the immediate sharing request, obtain rendering information of the search result page corresponding to the identification information, and generate a message for the search result page transmitted through the chat interface based on the rendering information of the search result page.

The at least one processor may be configured to, in the receiving of the immediate sharing request, determine a selected recommended search term as a search term based on a selection input for a recommended search term received through a predetermined area in which a list of recommended search terms is displayed in the chat interface and receive the immediate sharing request for the determined search term.

The list of recommended search terms may include at least one of a keyword input to a message input window in the chat interface, a related search term of a search term input to the message input window, a keyword input to a search window in the chat interface, a related search term of a search term input to the search window, and a keyword in a search history corresponding to a user account logged into the terminal.

The rendering information of the search result page may include a command to output the search result page created by a browser.

The immediate sharing request may include identification information of a user account logged into the terminal, identification information of a chat room corresponding to the chat interface, and a search query corresponding to the recommended search term.

The at least one processor may be configured to, in the obtaining of the identification information of the search result page, obtain identification information of a search result page corresponding to a predetermined type among a plurality of search result pages corresponding to the recommended search term.

The message may include a link to the search result page and visual content based on the rendering information.

The message may be sent to a terminal of a user account participating in a chat room corresponding to the chat interface.

The chat interface may include a chat interface switched to a search mode to call a search function.

According to an aspect, there is provided a terminal on which an app for a messaging service is installed including at least one processor configured to receive a list of recommended search terms through a chat interface of the app switched to a search mode, request immediate sharing of a search result for a search term based on the list of recommended search terms provided through the chat interface, and receive a message for a search result page of the search term through the chat interface.

BRIEF DESCRIPTION OF THE SEVERAL VIEWS OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Figure 1:
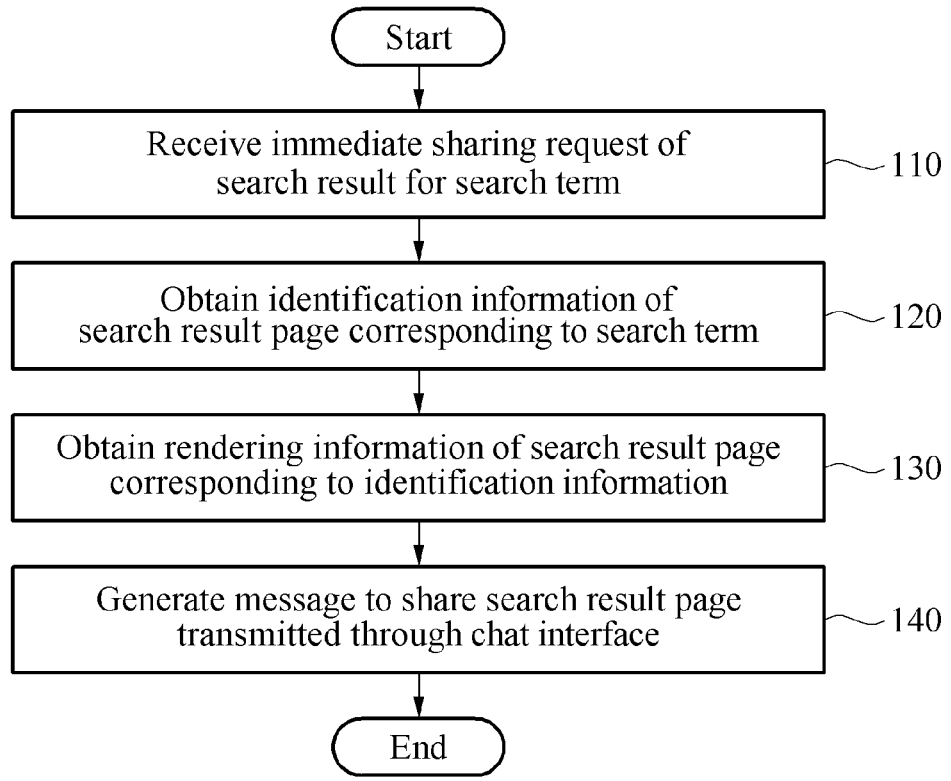
FIG. 1 is a flowchart illustrating an operation of a search server interlinked with a messaging service, according to an embodiment.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings. When describing the embodiments with reference to the accompanying drawings, like reference numerals refer to like components and a repeated description related thereto will be omitted.

FIG. 1 is a flowchart illustrating an operation of a search server interlinked with a messaging service, according to an embodiment.

Referring to FIG. 1, a method of operating a search server interlinked with a messaging service may include operation 110 of receiving an immediate sharing request of a search result for a search term, operation 120 of obtaining identification information of a search result page corresponding to the search term, operation 130 of obtaining rendering information of the search result page corresponding to the identification information, and operation 140 of generating a message to share the search result page transmitted through the chat interface.

According to an embodiment, the search server may provide a search function through an application or an app for the messaging service. The messaging service is a service for sending and receiving messages between subscribed users or sending a notification message to the subscribed users, and may include, for example, an instant messaging service (IMS) based on an instant message.

According to an embodiment, a messaging server providing the messaging service may create a user account for the messaging service in response to a messaging service subscription request of a user. The user account may be a unit for identifying users subscribing to a service. A terminal logged into the user account may use the service. Hereinafter, the terminal may refer to a terminal logged into the user account created by subscribing to the messaging service.

A terminal may be an electronic device, such as a computer, a portable computer, a wireless phone, a mobile phone, a smartphone, a personal digital assistant (PDA), a web tablet, a wearable device, and the like, and may refer to any devices for installing and executing an app. Here, the terminal may receive a service and/or content through an app. Under the control of the app, the terminal may perform all service operations such as service screen setting, data input, data transmission and reception, and data storage. For example, the terminal may process a user interface or user interaction through a processor and may output or transmit a processing result through an output device of the terminal.

According to an embodiment, an app installed in a terminal may include an app for the messaging service or a messenger app. The terminal may receive the messaging service under the control of the messenger app and may receive a search function provided by the search server interlinked with the messaging service. Hereinafter, the app for the messaging service may be referred to as an "app".

According to an embodiment, a chat interface may be provided to a terminal through the app. The chat interface is an interface for sending and receiving messages regarding the messaging service, and may include, for example, an interface that provides a function of sending messages through a chat room in which at least one user account participates and displaying received messages. The chat interface may correspond to a chat room, which is virtual space in which at least one user account participates and participants chat with each other.

According to an embodiment, the search server may provide the search function through a chat interface. The search function is a type of additional function provided to enhance user convenience in addition to a function of sending and receiving messages in an app for the messaging service, may refer to a function of providing a search result page for a search term input to the chat interface and sharing the search result page in the form of a message.

According to an embodiment, the search function may be provided through the search server or may be provided by interlinking with the messaging server. According to an embodiment, some functions of the search function may be provided by the messaging server.

According to an embodiment, in operation 110, the search server may receive an immediate sharing request of a search result for a recommended search term provided through a chat interface in a search mode, from a terminal that drives an app for the messaging service. The immediate sharing request may refer to a request to share the search result for the recommended search term provided through the chat interface without calling a web view. The immediate sharing request may be transmitted to the search server through a chat interface in a state in which a search result page for the recommended search term is not output. That is, the immediate sharing request may correspond to an input that requests sharing the search result page for the recommended search term in the form of a message to a chat room in a state in which the search result page for the recommended search term is not output on the chat interface. The message for sharing the search result page is described in detail below.

According to an embodiment, a chat interface where the immediate sharing request occurs may include a chat interface switched to a search mode to call the search function.

According to an embodiment, the search mode is a type of input mode of a chat interface and may correspond to an input mode to call the search function (e.g., a search application programming interface (API)). According to an embodiment, the type of input received through the chat interface and/or a way to process the input may be determined based on the input mode of the chat interface. For example, the input mode of the chat interface may include a chat mode and a search mode. The chat mode may correspond to an input mode to input a message. For example, a chat interface in the chat mode may receive a text input through a message input window and the input text may be transmitted as a message through the messaging server. The search mode may correspond to an input mode to call the search function. The chat interface in the search mode may be interlinked with a search server. For example, the chat interface in the search mode may be interlinked with the search server. For example, a text or a keyword input to the chat interface in the search mode may be transmitted to the search server.

According to an embodiment, a chat interface may be set to any one type of input mode. For example, when an execution request of a search mode is received through a chat interface in which the input mode is not set, the input mode of the chat interface may be set to a search mode. The input mode set to the chat interface may be switched to another type of input mode. For example, when the execution request of the search mode is received through a chat interface in a mode other than the search mode (e.g., a chat mode), the input mode of the chat interface may be switched to the search mode in the mode other than the search mode (e.g., a chat mode). For example, the execution request of the search mode may include an input for selecting an interfacing object to call the search function and/or an input of an identifier indicating a search term through a message input window.

According to an embodiment, when the input mode of the chat interface is switched from the chat mode to the search mode, the message input window in the chat interface may be changed to a search window or may be changed to perform a function of the search window. A text input to the search window may be transmitted to the search server by a search request. The message input window in the chat interface in the search mode may refer to the search window or the message input window performing the function of the search window.

According to an embodiment, operation 110 of receiving an immediate sharing request may include receiving the immediate sharing request based on a selection input for a search term received through a predetermined area in which a list of recommended search terms is displayed in a chat interface in a search mode. When a keyword is input to the chat interface in the search mode, the list of recommended search terms may be displayed in some areas of the chat interface. For example, the list of recommended search terms may include at least one of a keyword input to a message input window in a chat interface, a related search term of the keyword input to the message input window, a keyword input to a search window in the chat interface, a related search term of the keyword input to the search window, and a keyword in a search history corresponding to a user account logged into a terminal. The related search term may include a keyword similar to an input keyword, a keyword including the input keyword, and/or a keyword having a high probability of being searched with an input search term. A recommended search term in the list of recommended search terms may correspond to a text corresponding to one or more words.

According to an embodiment, at least one recommended search term selected from the list of recommended search terms may be determined as a search term. An immediate sharing of a search result for the determined search term may be requested to the search server. That is, in a state in which a search result page for the determined search term is not output on a chat interface, the immediate sharing of the search result page for the determined search term may be requested to the search server. The search server may generate a message to share the search result page for the determined search term.

According to an embodiment, the list of recommended search terms may be displayed in a predetermined area in a chat interface. For example, the list of recommended search terms may be displayed adjacent to a message input window. For example, the list of recommended search terms may be displayed on the upper end or the lower end of the message input window and may be displayed through a layer overlaying the message input window. For example, a layer displaying a list of recommended keywords may be implemented as a translucent layer.

According to an embodiment, when a keyword is input to a chat interface in the search mode, the search server may provide a recommended search term of the input keyword to a terminal through a chat interface. According to an embodiment, the terminal may store a set of recommended search terms corresponding to the keyword. In this case, the terminal may display, on the chat interface, a list of recommended search terms for the keyword input to the chat interface in the search mode.

According to an embodiment, each item of recommended search terms in a list of recommended search terms may include an interfacing object (e.g., a button) to request immediate sharing of a search result for a corresponding recommended search term. When an input for selecting the interfacing object for the immediate sharing request in each item of the recommended search terms is received through a chat interface, a recommended search term corresponding to an item of a selected recommended search term may be determined as a search term. The immediate sharing request of the search result for the determined search term may be transmitted to the search server. For example, an area where the list of recommended search terms is displayed may be divided into a plurality of rows and each item of the recommended search terms in the list of recommended search terms may be displayed in each row. The interfacing object (e.g., a button) for the immediate sharing request for a corresponding item of the recommended search terms may be added to each row where the item of recommended search terms is displayed. For example, the list of recommended search terms may include a predetermined number of recommended search terms.

According to an embodiment, the immediate sharing request may include identification information of a user account logged into a terminal, information of a target to be shared, and a search query corresponding to a search term. The identification information of the user account is information to identify a user account requesting immediate sharing of a search result and may be set as a sender of a message generated to share a search result page. The information of the target to be shared may include identification information of a chat room to share the search result and/or information of a counterpart user account to share the search result. The chat room to share the search result may be determined as a chat room corresponding to a chat interface where the immediate sharing request has occurred or as a chat room selected as a chat room to be shared when a user requests immediate sharing. The counterpart user account to share the search result may include a user account registered as a friend relationship with the user account requesting immediate sharing or a user account participating in the same chat room with the user account requesting immediate sharing. The search query may correspond to a command to request a search result page for a search term to the search server.

According to an embodiment, the immediate sharing request may be transmitted to the search server through a relay server. That is, the identification information of the user account, the identification information of the chat room, and the search query transmitted from a terminal may be directly transmitted to the search server or may be transmitted to the search server through the relay server.

According to an embodiment, in operation 120, a search server may obtain identification information of a search result page corresponding to a search term based on an immediate sharing request. For example, the search server may obtain identification information of a search result page corresponding to a search query. The search server may include an API (hereinafter, referred to as summary API) that generates identification information of the search result page corresponding to the search query based on a web browser. The search server may obtain identification information of the search result page corresponding to the search query by calling the summary API.

According to an embodiment, operation 120 of obtaining identification information of a search result page may include receiving identification information of a search result page corresponding to a predetermined type among a plurality of search result pages corresponding to a search term. The search result page may include the plurality of search result pages of predetermined types for the search term. For example, a search result page for a search term regarding a place name may include a plurality of search result pages of types of "place information", "restaurant", "cafe", "event", and "place to visit". Identification information for a first type of search result page among a plurality of types corresponding to the search result page may be received. The first type may be determined based on a predetermined order of the plurality of types. For example, in the case of a search term regarding a place name, a "place information" type may be determined as the first type.

According to an embodiment, in operation 130, a search server may obtain rendering information of a search result page corresponding to identification information based on a certain browser. For example, in operation 130, the search server may obtain the rendering information of the search result page based on a headless browser. Operation 130 of obtaining the rendering information may include obtaining rendering information using the headless browser that operates without a graphical user interface (GUI). Accordingly, operation 130 of obtaining the rendering information may not involve outputting the search result page through an interface.

According to an embodiment, rendering information of a search result page may include a command to output the search result page. A message including information about the search result page may be created based on the rendering information of the search result page. For example, the message may include summary information of the search result page and/or information about at least a part of the search result page.

According to an embodiment, a search server may obtain rendering information of a search result page. The search server may include an API (hereinafter, referred to as a search rendering API) that generates rendering information of a search result page corresponding to identification information of the search result page based on a headless browser. The search server may obtain the rendering information of the search result page corresponding to identification information of the search result page by calling the search rendering API.

According to an embodiment, in operation 140, a search server may generate a message to share a search result page transmitted through a chat interface based on rendering information of the search result page. The message may be generated as an instant message sent through a corresponding chat room using a corresponding user account as a sender, based on identification information of a chat room and identification information of a user account in an immediate sharing request. The generated message may be sent to a terminal of a user account participating in a corresponding chat room through a chat room. A terminal of the user account may refer to a terminal logged in with the user account. Hereinafter, the message generated in operation 140 may be referred to as a "search result message".

For example, a search result message is a message to share a search result for a search term with participants in a chat room and may include a link to a search result page and visual content based on rendering information of the search result page. The visual content may include a summary screen of the search result page. A message including a link may be implemented to call a web view that outputs the search result page through the link. The search result message to share the search result for the search term is described in detail below.

According to an embodiment, a method of operating a terminal on which an app for a messaging service is installed may include receiving a list of recommended search terms through a chat interface of an app switched to a search mode, requesting immediate sharing of a search result for a search term in the list of recommended search terms to a search server interlinked with the app through a chat interface in which a web view outputting the search result is not called, and receiving a message to share a search result page of the search term through the chat interface.

According to an embodiment, a terminal may switch an input mode of a chat interface to a search mode in response to an execution request of the search mode. The execution request of the search mode may be generated by, for example, an input of a predetermined identifier (e.g., "#") through a message input window of the chat interface and/or a selection input of an interfacing object to switch to the search mode in the chat interface. The terminal may change the chat interface as the input mode of the chat interface is switched to the search mode. The chat interface in the search mode displayed on the terminal is described in detail with reference to FIGS. 2A and 2B.

According to an embodiment, a terminal may request immediate sharing of a search result for a search term to a search server through a list of recommended search terms received without calling a web view that outputs the search result for the search term. The list of recommended search terms may be displayed in some areas of a chat interface in a search mode. The list of recommended search terms may include at least one recommended search term and may include an interfacing object (e.g., a sharing button) to request immediate sharing corresponding to each recommended search term. At least one recommended search term selected from the list of recommended search terms may be determined as a search term and immediate sharing for the determined search term may be requested to the search server.

According to an embodiment, the requesting of immediate sharing of a search result for a search term without calling a web view of a terminal is described with reference to FIGS. 3A and 3B.

Figure 2A:
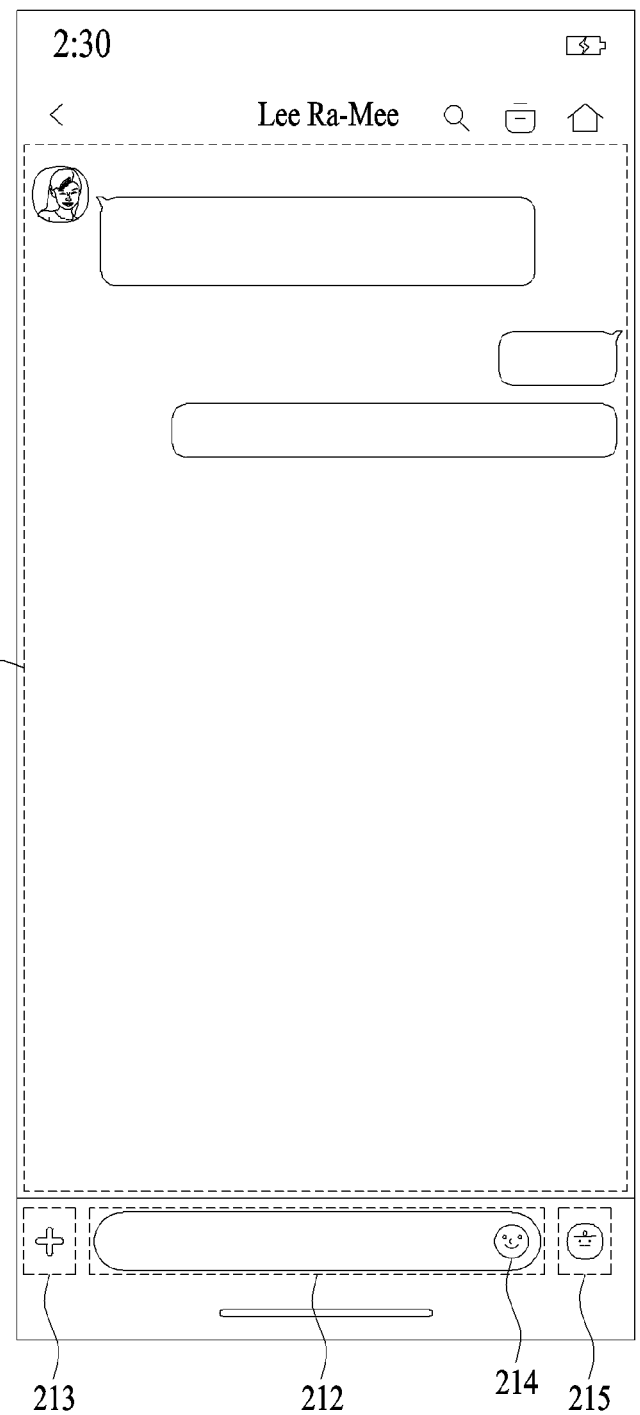
FIGS. 2A and 2B are diagrams illustrating an example of a screen of a chat interface according to an input mode according to an embodiment.
Figure 2B:
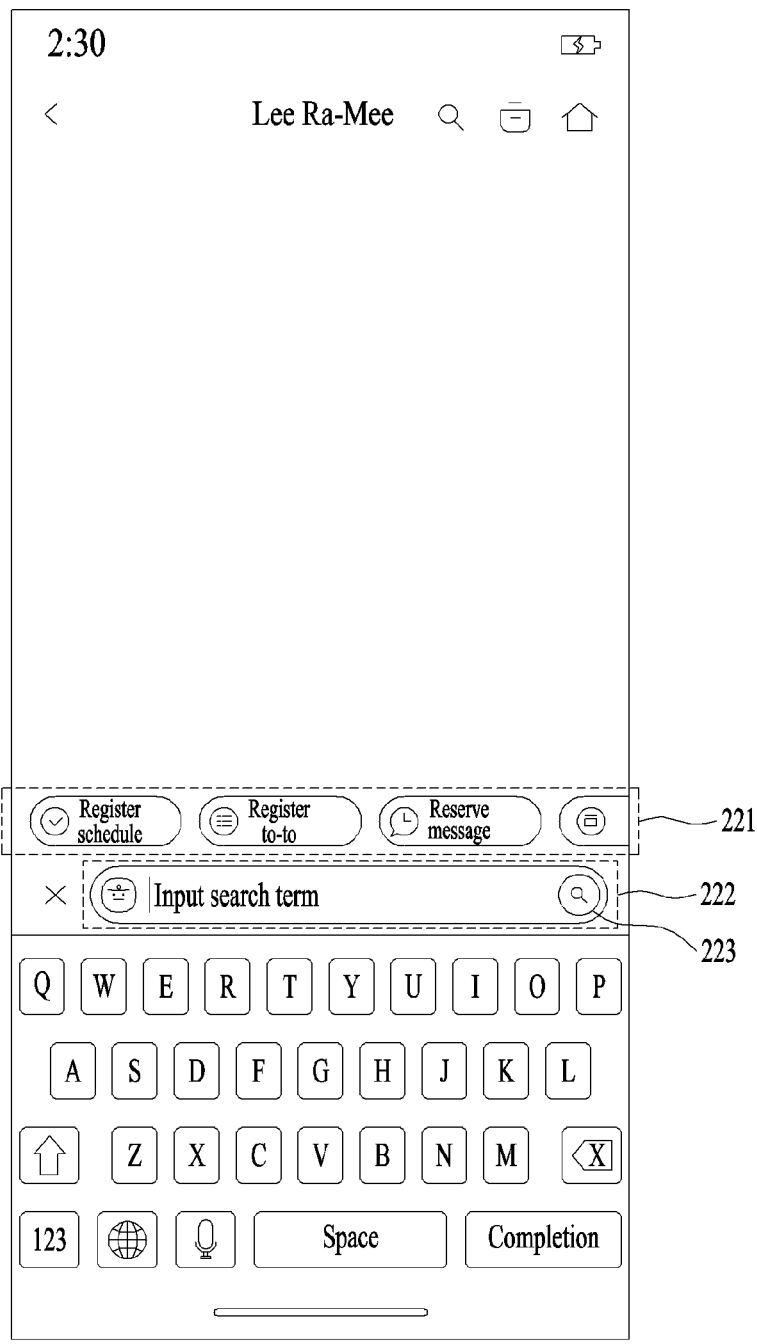

FIGS. 2A and 2B are diagrams illustrating an example of a screen of a chat interface according to an input mode according to an embodiment.

FIG. 2A is a diagram illustrating a screen 201 of a chat interface corresponding to a chat room provided to a terminal in response to access to the chat room. For example, the chat interface may include an interfacing object that supports a function for the messaging service, such as a chat window 211 that displays messages sent and received through a chat room, a message input window 212 to input a text to be sent as a message, and/or buttons 213, 214, and 215 to request a certain function or service to the messaging server or search server.

According to an embodiment, an input mode of a chat interface may be set to a chat mode. For example, referring to FIG. 2A, when an input for selecting the message input window 212 is received, the input mode of the chat interface may be switched to the chat mode. In another example, the input mode of the chat interface may be set to the chat mode as a default. When the input mode of the chat interface is set to the chat mode, a virtual keyboard area to input a message may be displayed on the message input window 212. Although not shown in FIG. 2A, the chat interface in the chat mode may include an interfacing object for requesting to send a text that is input to the message input window 212 as a message. A terminal may transmit the request to send the text that is input to the message input window 212 as a message to the messaging server in response to an input received by the interfacing object for requesting to send the message.

According to an embodiment, a terminal may receive an input to determine an input mode through a chat interface. For example, the chat interface may include the button 215 to request a switch to a search mode. When an input for selecting the button 215 is received, the input mode of the chat interface may be switched to the search mode. For example, in response to the input for selecting the button 215, the screen 201 of a chat interface may be switched to a screen 202 of the chat interface corresponding to the search mode of FIG. 2B.

Referring to FIG. 2B, a chat interface in a search mode may include a search window 222 to call a search function. For example, the message input window 212 in the chat interface before switching to the search mode may be changed to the search window 222. The chat interface in the search mode may include the search window 222 and a button 223 for a search request on a search term that is input to the search window 222. For example, the chat interface in the search mode may further include a secretary function menu 221. The secretary function menu 221 may include buttons to call a schedule management function, a to-do management function, and a reservation message function. The schedule management function, the to-do management function, and the reservation message function may correspond to additional functions provided through the messaging service.

According to an embodiment, a text input to the search window 222 may be recognized as a search term. When an input for selecting the button 223 for a search request is received, a terminal may transmit a search term input to the search window 222 to a search server as a search query. The input for selecting the button 223 for a search request may refer to an input for calling a search function.

Figure 3A:
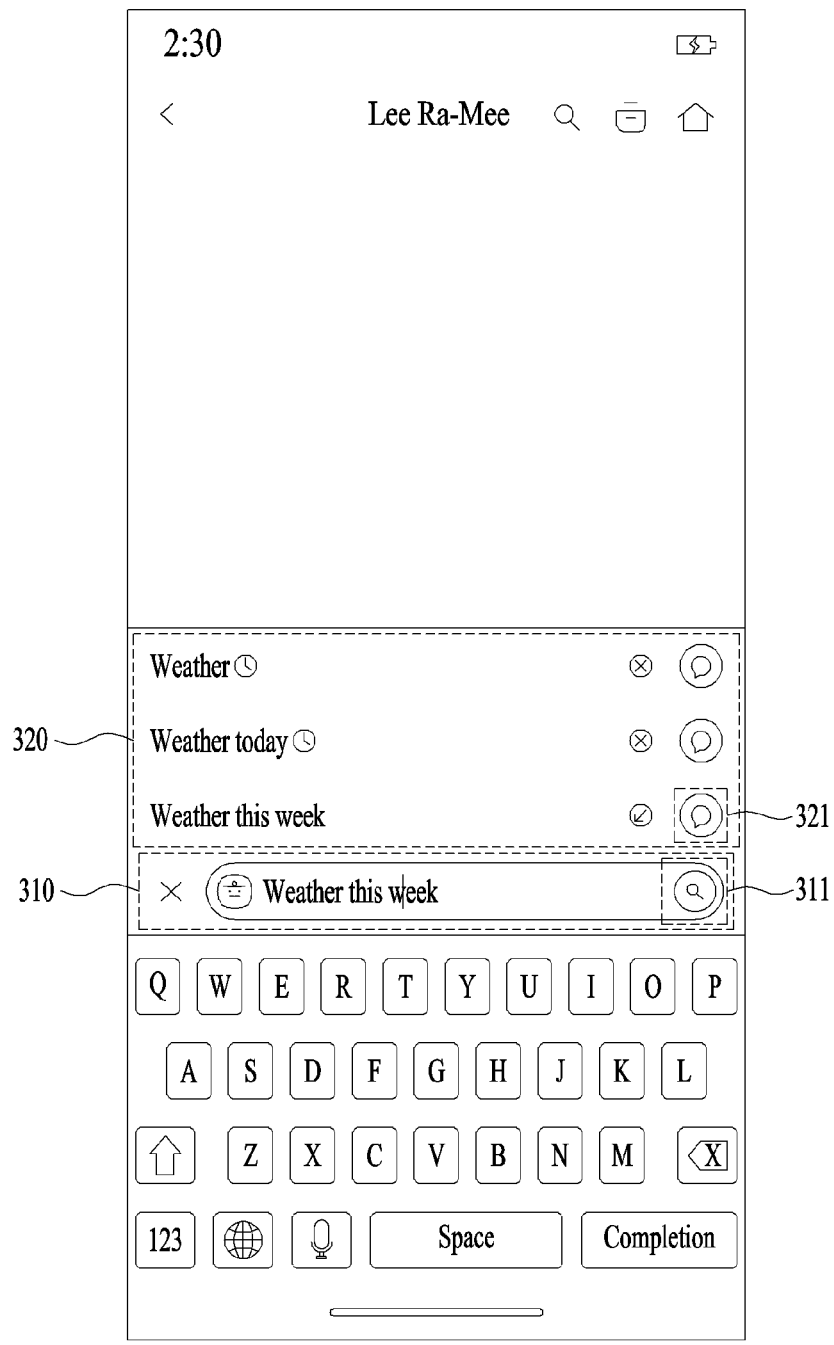
FIGS. 3A and 3B are diagrams illustrating a screen of a chat interface displaying a list of recommended search terms according to an embodiment.
Figure 3B:
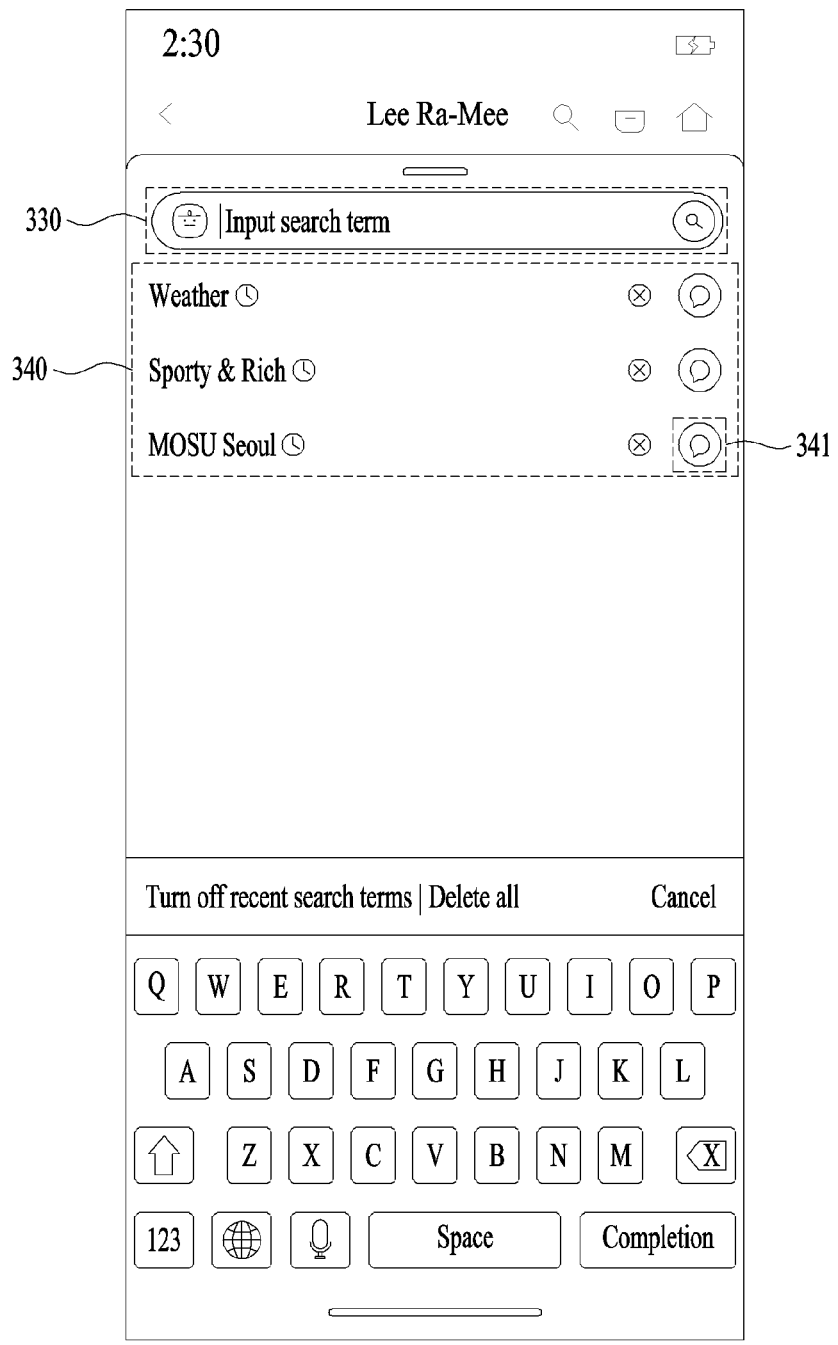

FIGS. 3A and 3B are diagrams illustrating a screen of a chat interface displaying a list of recommended search terms according to an embodiment.

Referring to a screen 301 shown in FIG. 3A, when a search term is input to a search window 310 of a chat interface, a list 320 of recommended search terms may be displayed in a certain area in the chat interface. The list 320 of recommended search terms may include a search term (e.g., the "weather this week") input to the search window 310 in the chat interface and a related search term (e.g., the "weather today" and the "weather") of the input search term. For example, the related search term may be received from a search server. In another example, a search term similar to the input search term among search terms in a search history corresponding to a user account logged into a terminal may be extracted as a related search term.

Referring to a screen 302 shown in FIG. 3B, when a search window 330 of a chat interface is activated, a list 340 of recommended search terms may be displayed in a certain area in the chat interface. The list 340 of recommended search terms may include a search term (e.g., the "weather", "Sporty & Rich", and "MOSU Seoul") in a search history corresponding to a user account logged into a terminal.

Referring to FIGS. 3A and 3B, by an input for selecting buttons 321 and 341 for each search term item in the lists 320 and 340 of recommended search terms, an immediate sharing request of a search result for a corresponding search term may be transmitted to a search server. The immediate sharing request may be received through a chat interface in a state in which a web view outputting a search result page is not called. That is, by an input for selecting the buttons 321 and 341 for a search term item, a search result page may be shared in a chat room in the form of a message without calling a web view that outputs the search result page for the search term.

Figure 4:
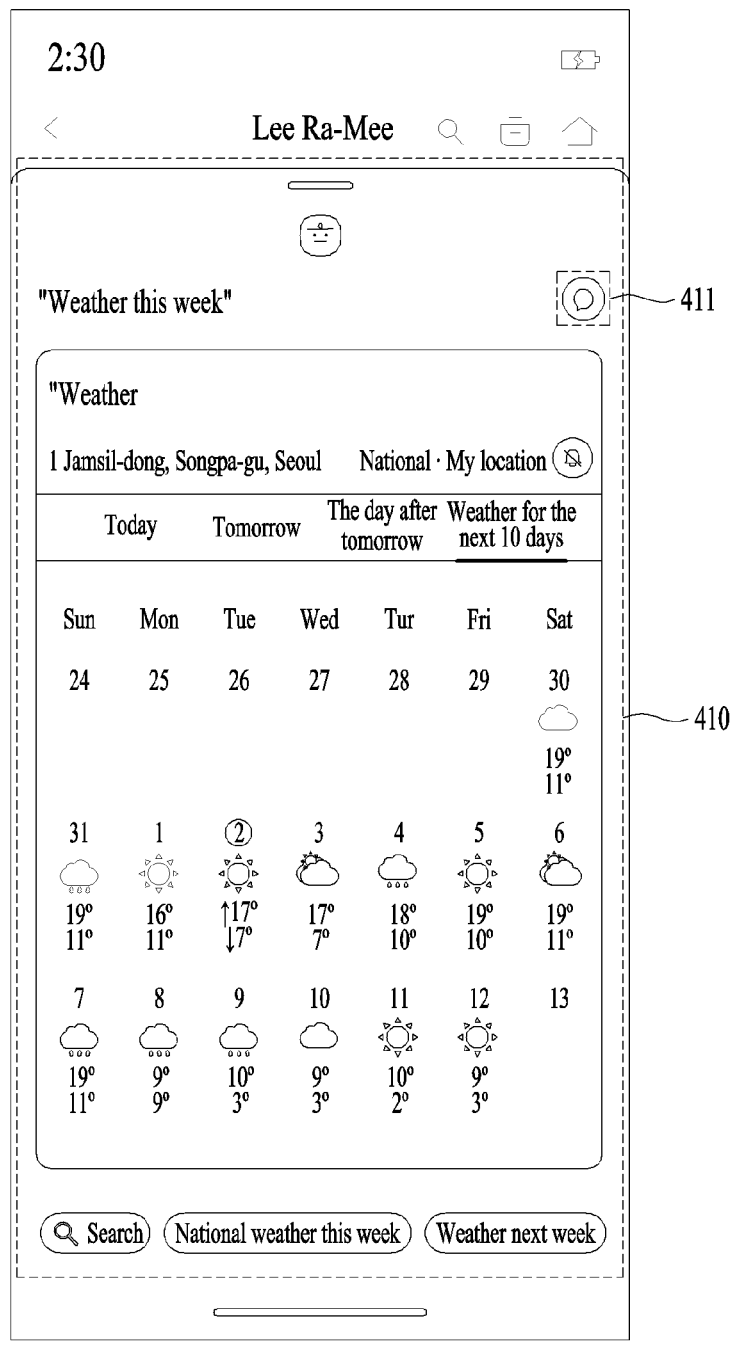
FIG. 4 is a diagram illustrating a screen of a chat interface from which a web view is called according to an embodiment.

According to an embodiment, a chat interface in which a web view displaying a search result page is called may be an example of a screen 401 shown in FIG. 4. Referring to the screen 401 shown in FIG. 4, a web view 410 outputting the search result through the chat interface may be displayed. For example, when an input for selecting a button 311 for a search request for a search term that is input to the search window 310 of FIG. 3A is received, the web view 410 outputting the search result page for the search term may be called. In another example, when a selection input for a search result message transmitted through a chat room is received, the web view 410 to output a search result page may be called through the chat interface.

Figure 5:
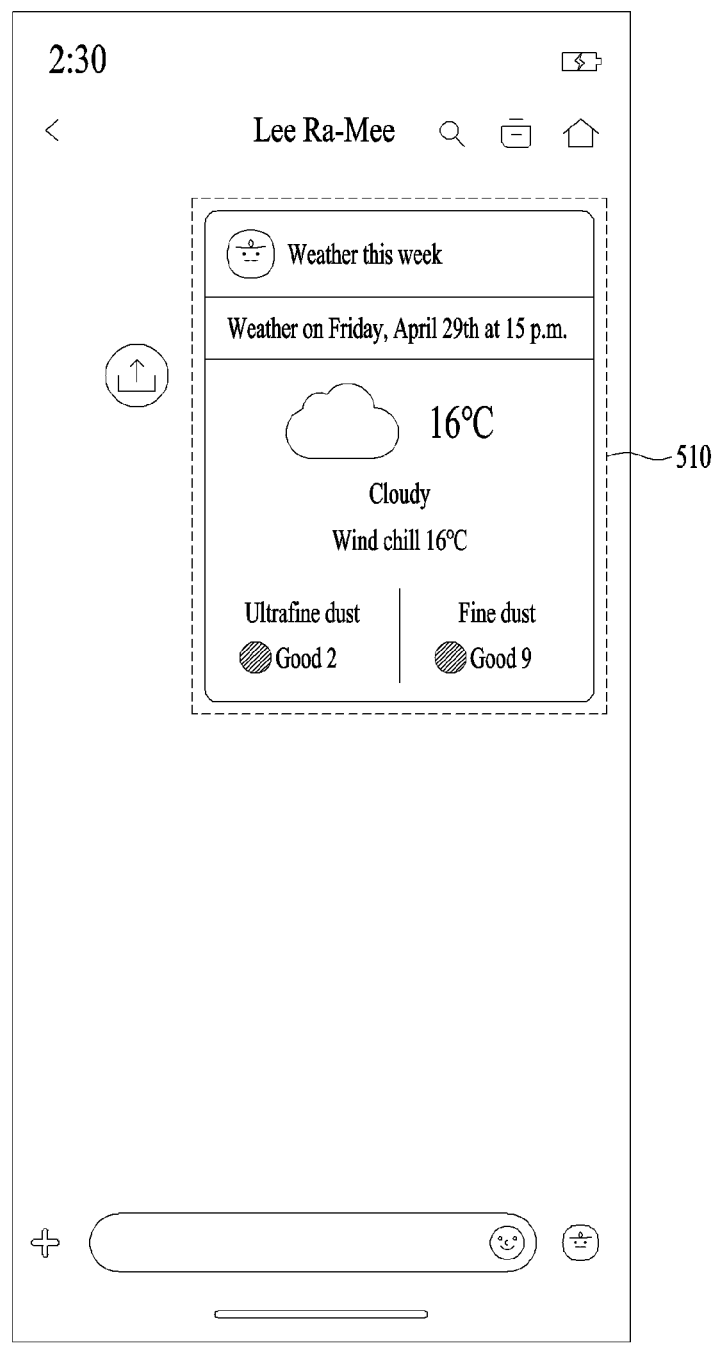
FIG. 5 is a diagram illustrating a screen of a chat interface in which a search result is shared according to an embodiment.

FIG. 5 is a diagram illustrating a screen of a chat interface in which a search result is shared according to an embodiment.

As described above, the search server may generate a message (or a search result message) to share a search result page transmitted through a chat interface based on rendering information of the search result page for a search term to which immediate sharing is requested. The generated message may be sent to a terminal of a user account participating in a corresponding chat room through a chat room.

Referring to a screen 501 of a chat interface shown in FIG. 5, the chat interface corresponding to a chat room to be shared of a search result may display a search result message 510 transmitted by an immediate sharing request. The chat interface corresponding to the chat room to be shared of the search result may be provided to a terminal logged in with a user account participating in a corresponding chat room. The chat room to be shared of the search result may be determined based on identification information of the chat room in the immediate sharing request of the search result.

According to an embodiment, the search result message 510 may include visual content based on rendering information of a search result page. For example, the search result message 510 may include a summary screen of the search result page.

According to an embodiment, the search result message 510 may include a link to a search result page. A terminal may call a web view outputting the search result page through the link in the search result message 510 in response to an input for selecting the search result message 510 to a chat interface. For example, when an input for selecting the search result message 510 for a search term "weather this week" is received, as shown in the screen 401 shown in FIG. 4, the web view 410 to output a search result page for the search term "weather this week" may be displayed.

Figure 6A:
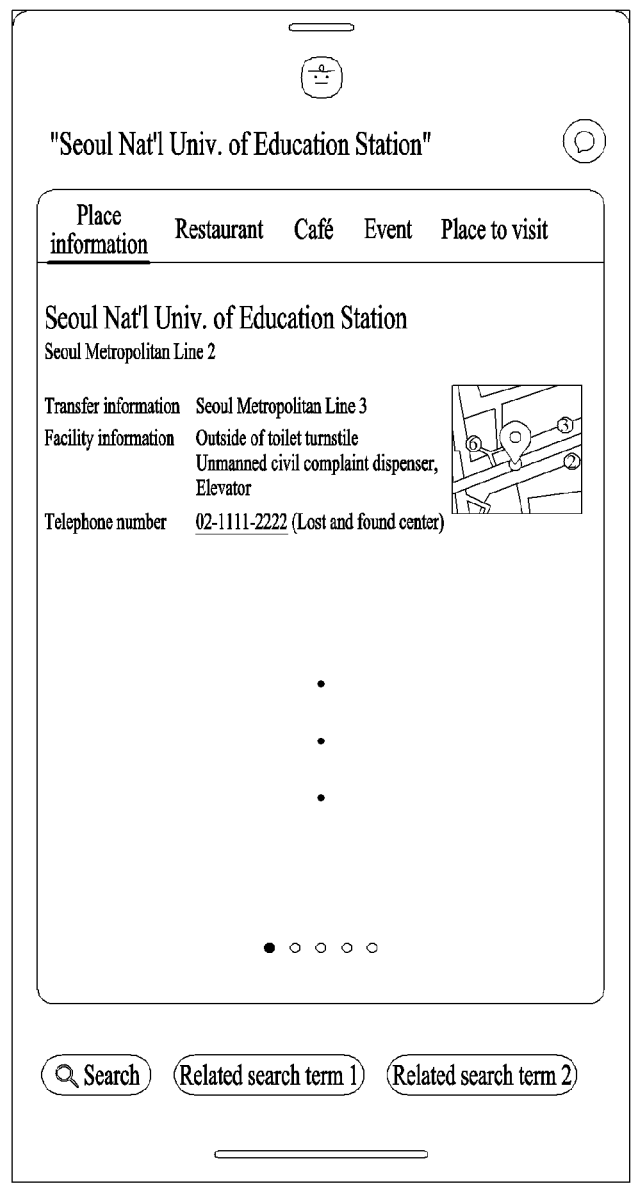
FIGS. 6A and 6B are diagrams illustrating a search result page of a plurality of types according to an embodiment.
Figure 6B:
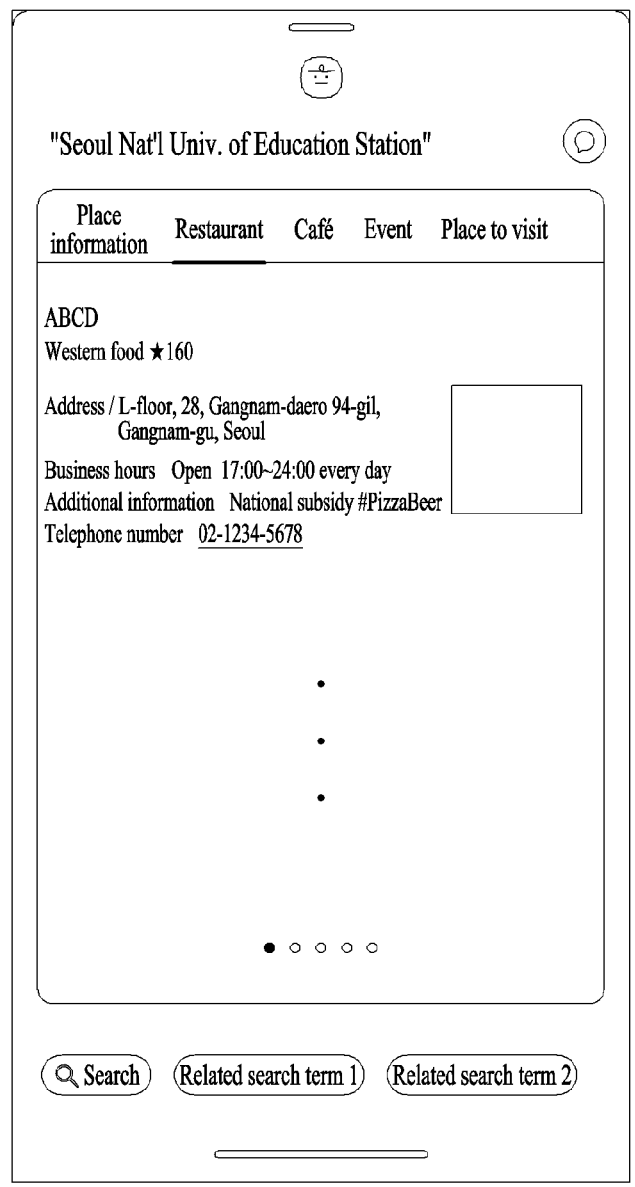

FIGS. 6A and 6B are diagrams illustrating a search result page of a plurality of types according to an embodiment.

According to an embodiment, a search result page for a search term to which immediate sharing is requested may include a plurality of search result pages of predetermined types for the search term.

For example, referring to FIG. 6A, a search result page for "Seoul Nat'l Univ. of Education Station", which is a search term corresponding to a place name, may include a search result page 601 of a "place information" type including basic information about the place. In another example, referring to FIG. 6B, a search result page for "Seoul Nat'l Univ. of Education Station", which is a search term corresponding to the place name, may include a search result page 602 of a "restaurant" type including a list of restaurants near the place. In addition, a search result page for "Seoul Nat'l Univ. of Education Station", which is a search term corresponding to the place name, may include a plurality of search result pages of "cafe", "event", and "place to visit" types in addition to "place information" and "restaurant" types.

According to an embodiment, a plurality of search result pages for a search term may be rendered in response to an immediate sharing request of a search result for the search term. A generated search result message may include a link to at least one type of search result page according to a predetermined criterion. For example, the link in the search result message may correspond to a link to a first type of search result page. When an input for selecting a search result message including the link to the first type of search result page is received, the first type of search result page may be displayed through a web view in a chat interface.

According to an embodiment, a search result message may include information about a search result page displayed first among search result pages for a search term connected through a message. A certain type of search result page connected through the search result message may include link information leading to another type of a search result page.

According to an embodiment, the search server interlinked with the messaging service may include a processor, a memory, and a communication module.

According to an embodiment, the processor of the search server may perform at least one operation of the search server described with reference to FIG. 1. For example, the processor of the search server may perform at least one of operation 110 of receiving an immediate sharing request of a search result for a search term described with reference to FIG. 1, operation 120 of obtaining identification information of a search result pace corresponding to the search term, operation 130 of obtaining rendering information of the search result page corresponding to the identification information, and operation 140 of generating a message to share the search result page transmitted through a chat interface.

According to an embodiment, the memory of the search server may store data necessary for performing the method described with reference to FIG. 1 and/or data generated by performing the method described with reference to FIG. 1. The memory may be a volatile memory or a non-volatile memory.

According to an embodiment, the memory of the search server may store a program in which the method described with reference to FIG. 1 is implemented. The processor of the search server may execute a program stored in the memory and control the search server. Code of the program executed by the processor of the search server may be stored in the memory.

According to an embodiment, the search server may be connected to an external device (e.g., a terminal or a network) through the communication module and exchange data therewith.

The examples described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the examples may be recorded in non-transitory computer-readable media including program instructions to implement various operations of the examples. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

The above-described hardware devices may be configured to act as one or more software modules in order to perform the operations of the above-described examples, or vice versa.

Although the examples have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a search server interlinked with a messaging service, the method comprising:
   receiving an immediate sharing request of a search result for a recommended search term provided through a chat interface in a search mode, from a terminal that drives an app for the messaging service;
   obtaining identification information of a search result page corresponding to the recommended search term based on the immediate sharing request;
   obtaining rendering information for outputting the search result page corresponding to the identification information; and
   generating a message for the search result page transmitted through the chat interface based on the rendering information of the search result page,
   wherein the rendering information of the search result page comprises a command to output the search result page created in a browser.

2. The method of claim 1, wherein the receiving of the immediate sharing request comprises:
   determining a selected recommended search term as a search term based on a selection input for a recommended search term received through a predetermined area in which a list of recommended search terms is displayed in the chat interface; and
   receiving the immediate sharing request for the determined search term.

3. The method of claim 2, wherein the list of recommended search terms comprises at least one of:
- a keyword input to a message input window in the chat interface;
- a related search term of a search term input to the message input window;
- a keyword input to a search window in the chat interface;
- a related search term of a search term input to the search window; and
- a keyword in a search history corresponding to a user account logged into the terminal.

4. The method of claim 1, wherein the immediate sharing request comprises identification information of a user account logged into the terminal, identification information of a chat room corresponding to the chat interface, and a search query corresponding to the recommended search term.

5. The method of claim 1, wherein the obtaining of the identification information of the search result page comprises obtaining identification information of a search result page corresponding to a predetermined type among a plurality of search result pages corresponding to the recommended search term.

6. The method of claim 1, wherein the message comprises a link to the search result page and visual content based on the rendering information.

7. The method of claim 1, wherein the message is sent to a terminal of a user account participating in a chat room corresponding to the chat interface.

8. The method of claim 1, wherein the chat interface comprises a chat interface switched to a search mode to call a search function.

9. A non-transitory computer-readable storage medium storing instructions that, when executed by one or more processors, cause the one or more processors to perform a method comprising:
- receiving an immediate sharing request of a search result for a recommended search term provided through a chat interface in a search mode, from a terminal that drives an app for a messaging service;
- obtaining identification information of a search result page corresponding to the recommended search term based on the immediate sharing request;
- obtaining rendering information for outputting the search result page corresponding to the identification information; and
- generating a message for the search result page transmitted through the chat interface based on the rendering information of the search result page,
- wherein the rendering information of the search result page comprises a command to output the search result page created in a browser.

10. A search server interlinked with a messaging service, the search server comprising:
at least one processor configured to:
- receive an immediate sharing request of a search result for a recommended search term provided through a chat interface in a search mode, from a terminal that drives an app for the messaging service;
- obtain identification information of a search result page corresponding to the recommended search term based on the immediate sharing request;
- obtain rendering information for outputting the search result page corresponding to the identification information; and
- generate a message for the search result page transmitted through the chat interface based on the rendering information of the search result page,
- wherein the rendering information of the search result page comprises a command to output the search result page created in a browser.

11. The search server of claim 10, wherein the at least one processor is configured to, in the receiving of the immediate sharing request:
- determine a selected recommended search term as a search term based on a selection input for a recommended search term received through a predetermined area in which a list of recommended search terms is displayed in the chat interface; and
- receive the immediate sharing request for the determined search term.

12. The search server of claim 10, wherein the list of recommended search terms comprises at least one of:
- a keyword input to a message input window in the chat interface;
- a related search term of a search term input to the message input window;
- a keyword input to a search window in the chat interface;
- a related search term of a search term input to the search window; and
- a keyword in a search history corresponding to a user account logged into the terminal.

13. The search server of claim 10, wherein the immediate sharing request comprises identification information of a user account logged into the terminal, identification information of a chat room corresponding to the chat interface, and a search query corresponding to the recommended search term.

14. The search server of claim 10, wherein the at least one processor is configured to, in the obtaining of the identification information of the search result page, obtain identification information of a search result page corresponding to a predetermined type among a plurality of search result pages corresponding to the recommended search term.

15. The search server of claim 10, wherein the message comprises a link to the search result page and visual content based on the rendering information.

16. The search server of claim 10, wherein the message is sent to a terminal of a user account participating in a chat room corresponding to the chat interface.

17. The search server of claim 10, wherein the chat interface comprises a chat interface switched to a search mode to call a search function.

* * * * *